(12) United States Patent
Teng et al.

(10) Patent No.: US 7,316,553 B2
(45) Date of Patent: Jan. 8, 2008

(54) DRIVE ASSEMBLY FOR ROTATING AND TRANSLATING A SHAFT

(75) Inventors: Alex Teng, Richmond Hill (CA); John R. Galt, Nobleton (CA); Martin R. Kestle, Luxembourg (LU)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 561 days.

(21) Appl. No.: 10/873,288

(22) Filed: Jun. 23, 2004

(65) Prior Publication Data

US 2005/0048162 A1 Mar. 3, 2005

(30) Foreign Application Priority Data

Aug. 25, 2003 (CA) .................. PCT/CA03/01260

(51) Int. Cl.
*B29C 45/80* (2006.01)
(52) U.S. Cl. ...................... 425/145; 425/150
(58) Field of Classification Search ............... 425/145, 425/150
See application file for complete search history.

(56) References Cited

U.S. PATENT DOCUMENTS

| | | | | |
|---|---|---|---|---|
| 4,105,147 A | 8/1978 | Stubbe | ........................ | 222/413 |
| 4,192,616 A | 3/1980 | Spanier | ........................ | 366/79 |
| 4,895,505 A | 1/1990 | Inaba et al. | ................... | 425/145 |
| 5,540,495 A | 7/1996 | Pickel | ........................ | 366/78 |
| 5,645,868 A | 7/1997 | Reinhart | ..................... | 425/145 |
| 5,747,076 A | 5/1998 | Jaroschek et al. | ........... | 425/145 |
| 5,804,224 A | 9/1998 | Inaba et al. | ................... | 425/150 |
| 5,891,485 A | 4/1999 | Emoto | ........................ | 425/145 |
| 6,068,810 A | 5/2000 | Kestle et al. | ............. | 264/328.1 |
| 6,108,587 A | 8/2000 | Shearer et al. | ............... | 700/200 |
| 6,394,780 B1 * | 5/2002 | Hehl | ........................... | 425/145 |
| 6,478,572 B1 | 11/2002 | Schad | ........................ | 425/574 |
| 6,499,989 B2 | 12/2002 | Koide et al. | ................ | 425/556 |
| 6,517,336 B1 | 2/2003 | Emoto et al. | ................ | 425/145 |
| 6,530,774 B2 | 3/2003 | Emoto | ........................ | 425/542 |
| 6,769,892 B1 * | 8/2004 | Hehl | ........................... | 425/145 |
| 7,033,158 B2 * | 4/2006 | Becker et al. | ............... | 425/150 |

(Continued)

FOREIGN PATENT DOCUMENTS

DE 101 35 443 A1 3/2002

(Continued)

*Primary Examiner*—Tim Heitbrink

(57) ABSTRACT

A drive assembly for rotating and translating a shaft comprising a hollow shaft motor and a fluid cylinder. The hollow shaft motor rotates the shaft and the fluid cylinder moves the shaft lengthwise. The drive is particularly useful in the injection unit of an injection-molding machine. In one preferred embodiment the injection unit includes a hollow electric motor and a hydraulic cylinder. A first cylinder wall of the hydraulic cylinder is joined to a rotor of the hollow motor. A second cylinder wall of the cylinder is connected to a stationary portion of the hollow motor. A piston has two end portions. One end portion of the piston engages the first cylinder wall and the other end portion of the piston engages the second cylinder wall. Means for rotating the piston are attached to the rotor. The means for rotating also permits the piston end portions to slide along the cylinder walls. One channel means provides hydraulic fluid to drive the piston in a forward direction and another channel means provides hydraulic fluid to drive the piston in a reverse direction. Means are provided for attaching an injection screw to the piston. In the preferred arrangement, the cylinder is at least partially situated within the hollow motor.

39 Claims, 8 Drawing Sheets

U.S. PATENT DOCUMENTS

2002/0168445 A1  11/2002  Emoto et al. ............... 425/558

FOREIGN PATENT DOCUMENTS

| EP | 0 967 064 A1 | 12/1999 |
| EP | 1 162 053 A2 | 12/2001 |
| GB | 1094037 | 12/1967 |
| JP | 61-266218 | 11/1986 |
| WO | WO 03/046388 A1 | 6/2003 |

* cited by examiner

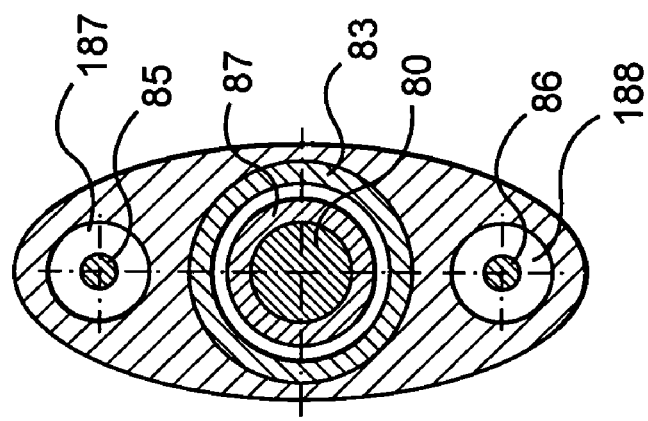
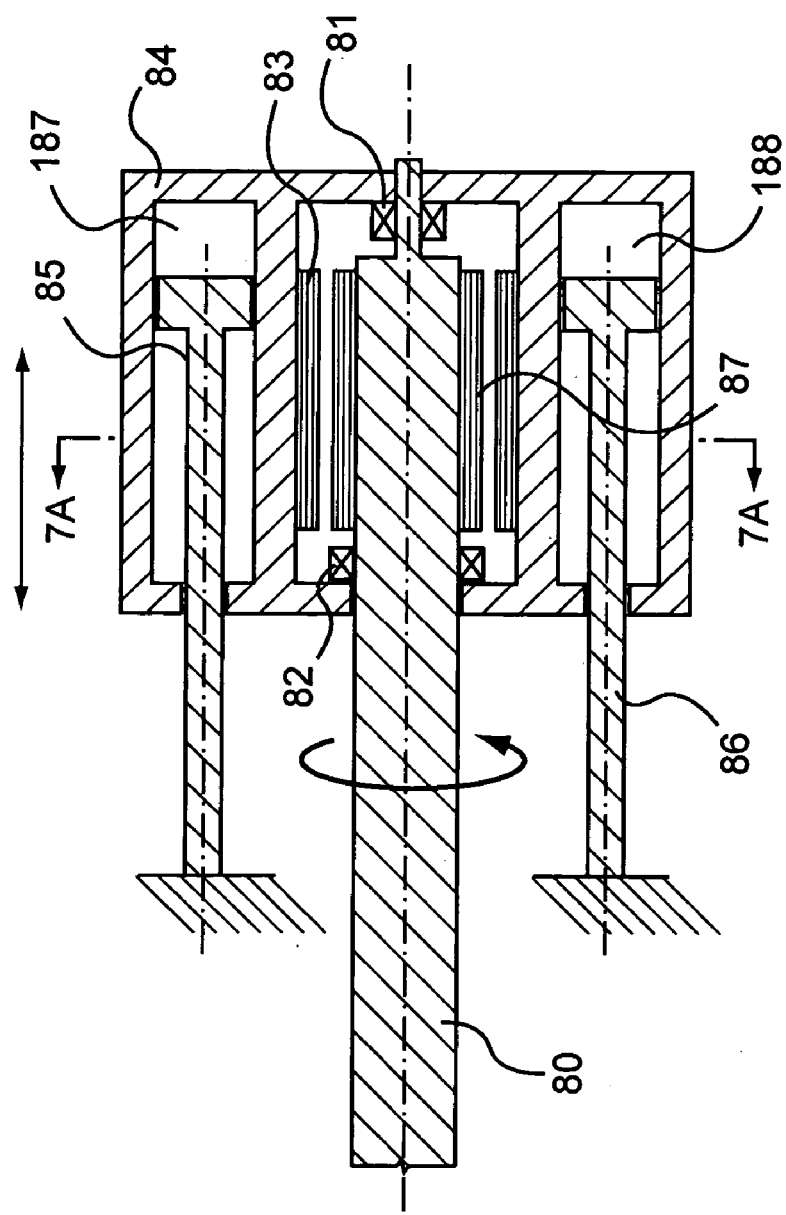
FIG. 7A
FIG. 7

DRIVE ASSEMBLY FOR ROTATING AND TRANSLATING A SHAFT

TECHNICAL FIELD

This invention relates to drive apparatus for rotating and translating a shaft. The invention is particularly useful for driving a plasticating screw of an injection-molding machine. More specifically, the invention relates to drive apparatus for rotating and reciprocating a plasticizing screw of an injection-molding machine wherein the screw is rotated by a hollow electric motor and reciprocated by a hydraulic piston.

BACKGROUND OF THE INVENTION

The use of hollow motors and hydraulic pistons to drive and rotate plasticating screws is known. However, none of the known systems suggests combining the advantages of hollow motors to rotate the plasticating screw while using a hydraulic piston to move it lengthwise.

U.S. Pat. No. 4,105,147 to Stubbe describes a screw extruder rotated by a gear drive from an electric motor and moved lengthwise by a hydraulic piston. The screw has a splined shaft end to permit sliding of the shaft through the gear drive.

The U.S. Pat. No. 4,895,505 to Fanuc Ltd. describes a linear motor for moving an injection screw linearly. The linear motor includes a series of permanent magnets attached to the motor armature that react with the alternating current supplied to the surrounding stator windings to cause linear movement of the armature and the screw shaft attached to the armature. The patent describes the use of a hollow motor to move a screw shaft linearly.

The U.S. Pat. No. 5,540,495 issued Jul. 30, 1996 to Krauss-Maffei describes an extruder screw drive that includes a first motor for translating movement of the screw and a second motor for rotating the screw. The described embodiment shows two hollow motors. The drive means for translating the screw and the slide means for rotating the screw fit partially within one another.

U.S. Pat. No. 5,645,868 to Reinhart describes a drive apparatus for an injection unit that includes a hollow electric motor that engages the screw shaft through three clutches. One clutch provides rotation of the screw, a second enables forward movement of the screw and a third prevents the screw from rotating while it is being moved forward. No hydraulic units are used.

U.S. Pat. No. 5,747,076 to Jaroschek et al describes an injection-molding machine that uses a hydraulic piston to assist an electric motor driving a rack and pinion mechanism to advance the screw.

The U.S. Pat. No. 5,804,224 issued Sep. 8, 1998 to Fanuc Ltd. describes an arrangement where a ball screw is integrally formed on the rotor shaft. A motor positioned coaxially with it rotates the ball screw.

The U.S. Pat. No. 5,891,485 issued Apr. 6, 1999 to Sumitomo describes an injection apparatus that includes two hollow shaft electric motors. One motor is intended to rotate the screw shaft while the other moves it lengthwise. The rotors of the two motors are coupled to the shaft. Each rotor is located in a separate chamber.

U.S. Pat. No. 6,068,810 to Kestle et al describes an injection unit having a quill inside a piston to enable retraction and extension of the screw by the application of hydraulic pressure. A motor rotates the quill, which is connected to the piston through a spline to thereby rotate the screw. The motor attaches to the end of the quill.

U.S. Pat. No. 6,108,587 to Shearer et al describes an injection molding system that includes a motor for driving gears to rotate the screw and a hydraulic piston for translating the screw.

U.S. Pat. No. 6,478,572 to Schad describes an injection unit that uses a single electric motor to rotate an extruder screw and charge a hydraulic accumulator. The charge in the accumulator is directed to stroke the extruder screw.

U.S. Pat. No. 6,499,989 describes a device for removing disks from a mold. In the described embodiments a hollow electric motor is used to rotate the take-out shaft and a linear electric motor is used to move the shaft linearly. The hollow motor drives the shaft through a gearbox that enables the speed of the shaft to be varied. As an alternative, the patent suggests that a pneumatic or hydraulic cylinder could be used to move the shaft linearly. In the embodiments described, the linear actuator is located outside the rotary actuator. This provides an assembly that is larger and less cost effective.

U.S. Pat. No. 6,517,336 to Emoto et al and European Patent No. 0967064 A1 to Emoto disclose an injection molding system having a hollow electric motor that rotates a screw shaft and at the same time causes the shaft to advance by means of a connection to a ball screw shaft/spline shaft unit. A separate metering motor rotates the screw to load the screw with resin. Rotational movement is provided through a belt and pulley arrangement that can rotate the screw independently of the rotor on the hollow motor. The rotor on the hollow motor is attached to a splined portion of the screw shaft and is used to rotate the splined portion, which, in turn, rotates a ball screw to drive a ball nut and thereby move the shaft lengthwise.

U.S. Pat. No. 6,530,774 to Emoto describes an injection molding system using an electric motor and gear train to rotate the screw and a hollow shaft electric motor to move the screw lengthwise by driving a ball screw shaft through a splined shaft connection.

U.S. patent application Ser. No. 2002/0168445 A1 to Emoto et al describes an injection system that also includes a metering motor and a hollow shaft motor to rotate the screw and move the screw lengthwise, respectively.

The European Patent application 1162053 published Dec. 12, 2001 to Krauss-Maffei describes a two motor system where one motor provides rotational movement of the screw shaft and the other motor provides translational movement of the screw shaft. Clutch arrangements are used to enable the motors to operate separately or together.

The Japanese Patent 61266218 published Nov. 25, 1986 to Sumitomo describes a two motor injection system using hollow motors, a ball drive mechanism and splined shafts.

While these references describe many combinations of electric and hydraulic driving systems for a screw of an injection-molding machine, they fail to describe a system combining the unique advantages of better control of the positioning of the screw with a hollow electric motor and the high injection power provided by a hydraulic injection unit. The present invention provides a compact injection unit having the unique advantages of both electric and hydraulic driving systems.

SUMMARY OF THE INVENTION

The invention provides a novel drive unit for translating and rotating a shaft. The unit includes a hollow electric motor and at least one fluid cylinder and means for connecting at least a portion of the shaft to a rotor of the motor. The connecting means includes means that permit the shaft to move lengthwise. The fluid cylinder is connected to the shaft whereby the shaft can be rotated by the motor and moved lengthwise by the fluid cylinder.

According to one general aspect of the present invention, the drive unit is a part of an injection unit for an injection-molding machine with a hollow electric motor to rotate the injection screw and a hydraulic piston to reciprocate the screw.

More particularly, the invention provides an injection unit for an injection-molding machine, the injection unit including a hollow electric motor and an hydraulic cylinder, a first cylinder wall of the hydraulic cylinder is joined to a rotor of the hollow motor, a second cylinder wall of the hydraulic cylinder is connected to a stationary portion of the hollow motor, a piston is slidable along interior surfaces of the first and second cylinder walls, a first end portion of the piston engages the first cylinder wall and a second end portion of the piston engages the second cylinder wall, rotating means is attached to the rotor to rotate the piston, the rotating means permits the piston to slide along the cylinder walls, first channel means provides hydraulic fluid to drive the piston in a forward direction and second channel means provides hydraulic fluid to drive the piston in a reverse direction and an injection screw is attached to one end of the piston.

In a preferred embodiment, the hydraulic unit is at least partially situated within the hollow motor to thereby provide a smaller and more compact assembly.

BRIEF DESCRIPTION OF THE DRAWINGS

FIG. 7 is a cross-sectional side view of a further embodiment of the invention;

FIG. 7A is a sectional view of the embodiment shown in FIG. 7 taken along the section line 7A-7A.

DETAILED DESCRIPTION OF THE PREFERRED EMBODIMENT(S)

Figure 1:
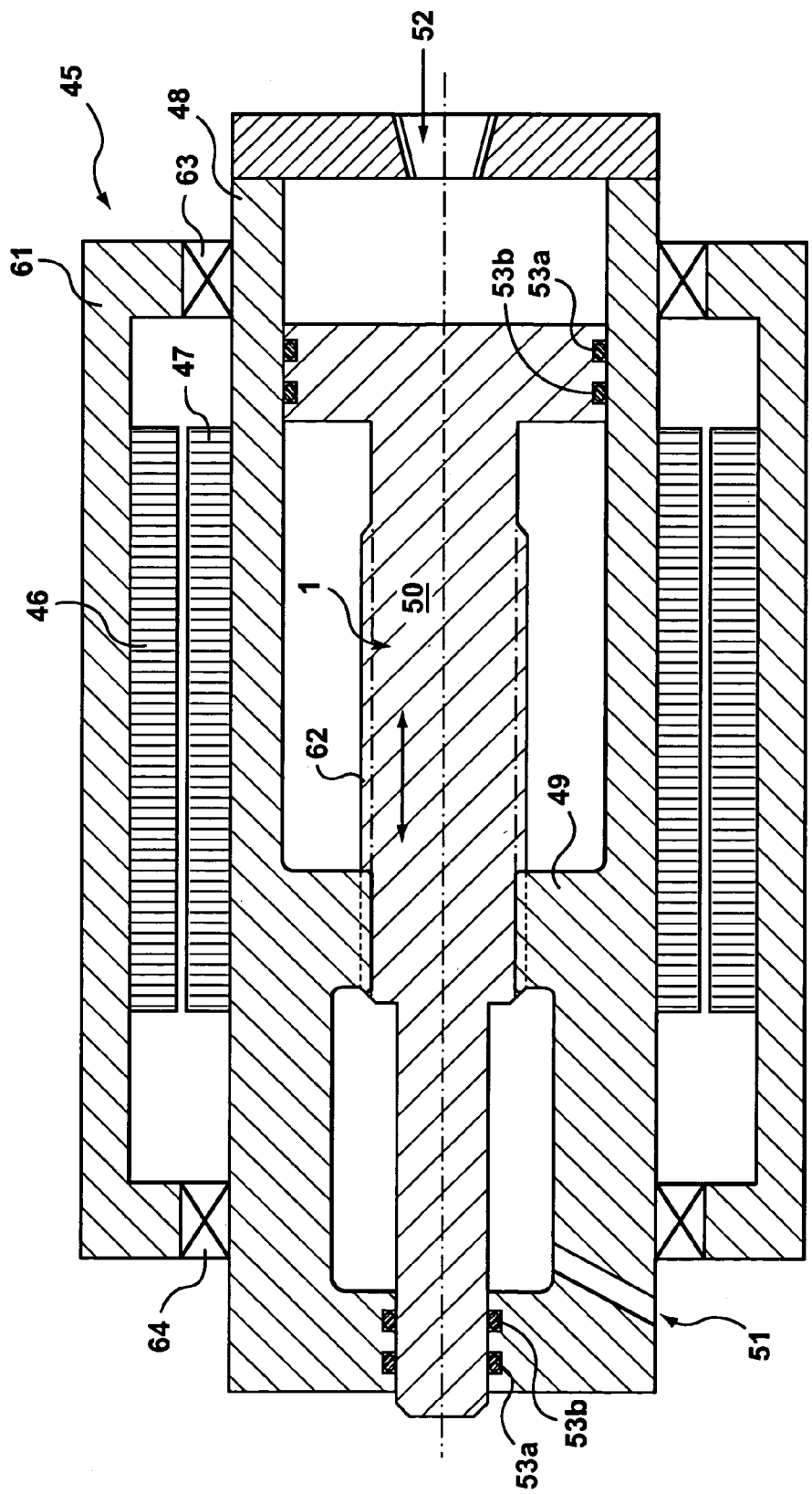
FIG. 1 is a cross-sectional sketch of a basic drive unit in accordance with the invention.

FIG. 1 illustrates the invention in a simple form. As shown in FIG. 1, a hollow shaft motor 45 has a housing 61, a stator 46 and a rotor 47. Stator 46 is shown mounted on a wall of housing 61. The rotor 47 is fixed onto cylinder 48. Cylinder 48 has a spline portion 49 formed on its interior surface. An insert fitted onto the cylinder 48 could replace the spline portion 49. The spline portion 49 engages splines 62 (one shown) on a piston 50. A shaft (not shown) integral with or attached to the piston 50 is rotated by motor 45 through the interconnection between the rotor 47 and the piston 50.

The shaft attached to the piston 50 is moved lengthwise by applying fluid pressure to either side of the head of the piston 50 through openings 51 and 52 in the wall of cylinder 48. When the drive unit is being used in an injection-molding machine, the fluid might be hydraulic oil or a water-based graphite solution. Piston 50 slides on spline portion 49 and rotates in bearings provided by wear rings 53a and fluid seals 53b. The entire assembly of rotor 47, cylinder 48 and piston 50 is rotatably supported and axially located in bearings 63 and 64.

While FIG. 1 illustrates a rudimentary sketch of the invention, those skilled will be able to make any minor modifications necessary to the construction of an acceptable drive unit in accordance with the invention. For example, means other than a spline shaft could be provided to permit sliding of the shaft while keeping the shaft rotatable. A single key sliding along a keyway could be used.

The drive unit will now be described with reference to a plasticating screw for an injection-molding machine. The invention is particularly suited to use in such a system where it is necessary to rotate the screw to melt the injection material and move the screw lengthwise with significant driving force to inject the material into a mold.

Figure 2:
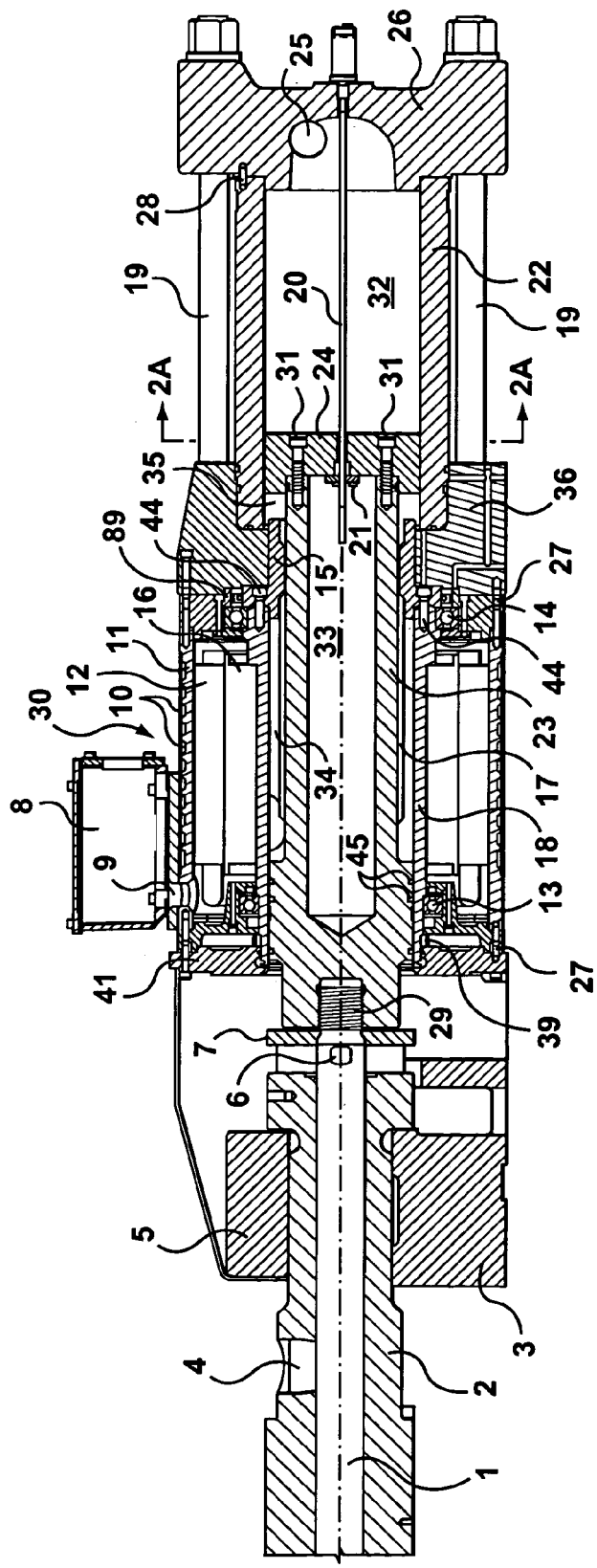
FIG. 2 is a cross-sectional side view of a preferred embodiment of the drive unit for an injection molding machine where the drive unit is in an extended position.
Figure 3:
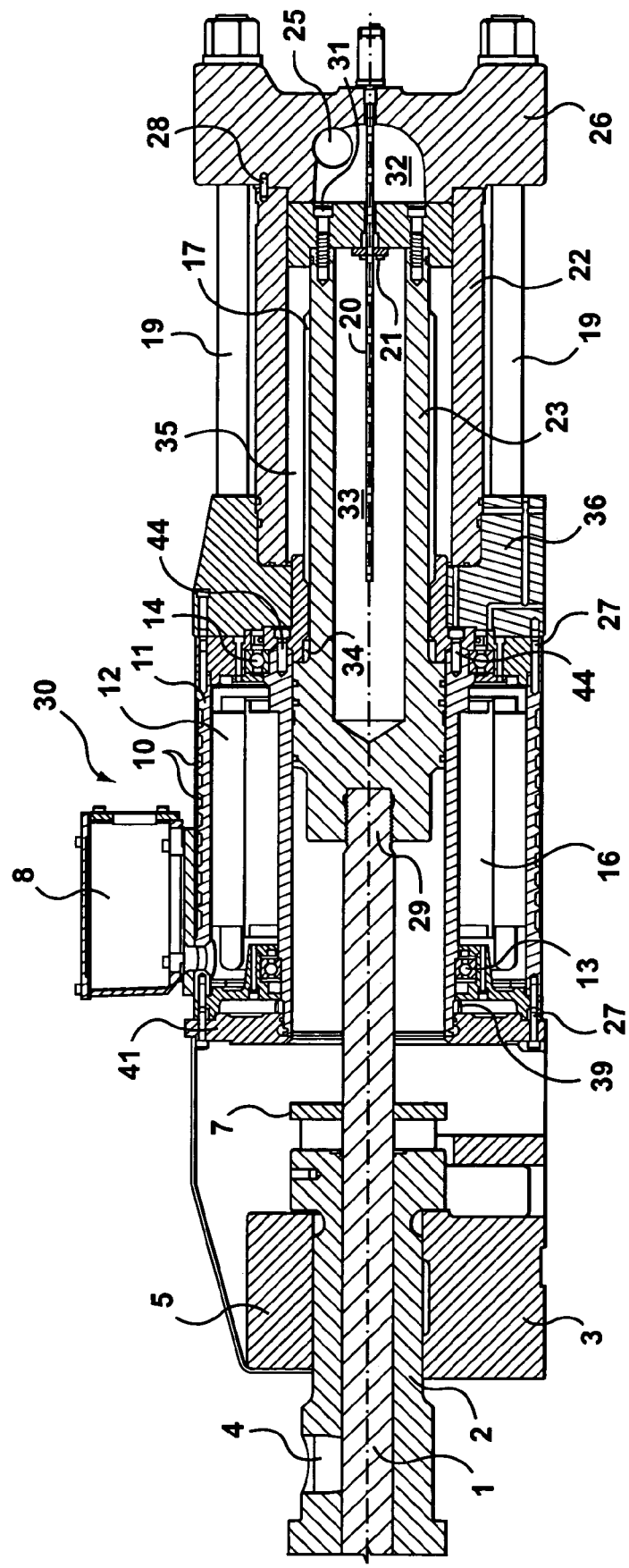
FIG. 3 is a cross-sectional side view of the preferred embodiment of the drive unit for an injection molding machine where the drive unit is in a retracted position.

Referring to FIGS. 2 and 3, a screw 1 resides in a barrel 2 and can rotate and move axially therein. Injection material, such as plastic pellets, is fed to screw 1 through opening 4. Barrel 2 is mounted in injection housing 3 and kept in place by means of a barrel retaining plate 5. The slot 6 is designed to receive a tool to hold the screw 1 in place while the piston 23 is rotated to unscrew the piston 23 from the screw 1 at the threaded connection 29. Piston stop 7 is designed to prevent rotation of the tool when the piston 23 is being retracted from the screw 1 and determines the fully extended position of the piston 23. This facility is provided to enable removal and replacement of the screw 1 when necessary.

The forward portion of piston 23 contacts the cylinder wall 18 through piston rings 45. The piston 23 moves axially along the wall 18 as the screw 1 is advanced and retracted. Spline slots 17 slide in spline insert 15 to enable the piston 23 to move lengthwise.

Figure 4:
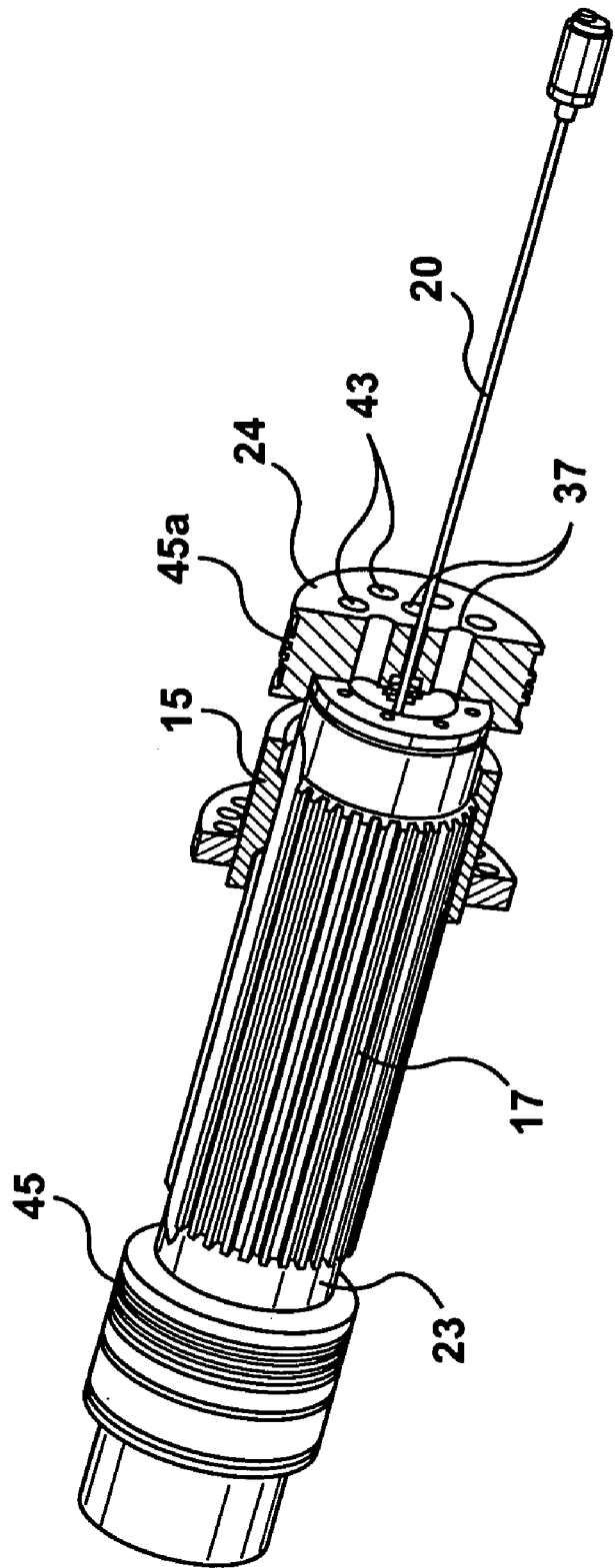
FIG. 4 is a perspective view of the piston and spline insert of the preferred drive unit.

The hollow motor 30 rotates piston 23 and thereby screw 1, which is attached to piston 23. Connector box 8 provides power to the motor 30 through wire channel 9. Stator 12 is energized to rotate the rotor 16. The motor 30 preferably has a permanent magnet rotor, however, any hollow electric motor could be used to rotate the piston 23 and screw 1. The rotor 16 is shrink fitted to the cylinder wall 18. The rotor 16 can be attached in any other way to the wall 18 so long as the rotor 16 and wall 18 move as a single unit. Spline insert 15 is connected to cylinder wall 18 by means of bolts 44. Spline insert 15 engages slots 17 (best shown in FIG. 4) on the exterior wall of piston 23. Thus, when rotor 16 rotates, cylinder wall 18 and piston 23 also rotate so there is no relative rotational motion between the cylinder wall 18 and the piston 23.

Cooling channels 10 are provided in motor housing 11 to enable cooling of the motor 30.

Figure 2A:
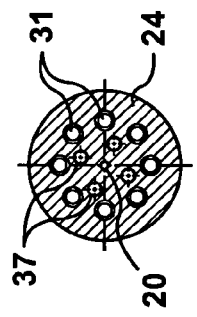
FIG. 2A is a cross-sectional view of the piston head for the drive unit shown in FIG. 2.
Figure 2B:
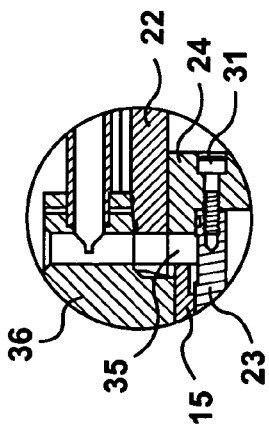
FIG. 2B is a partial sectional view illustrating a hydraulic supply channel to the piston of the drive unit shown in FIG. 2.

Piston head 24 is attached to the rearward end of piston 23 by bolts 31 and includes a plurality of channel openings 37 (see FIGS. 2A and 4) between regions 32 and 33. This enables the piston 23 to be of minimal thickness. Piston head 24 rotates and slides on cylinder wall 22 by means of piston rings 45a.

Hydraulic fluid such as hydraulic oil is supplied to regions 32 and 33 through hydraulic fluid channel 25 in rear housing 26 to propel piston 23 and screw 1 forward to inject material into a mold.

Figure 2C:
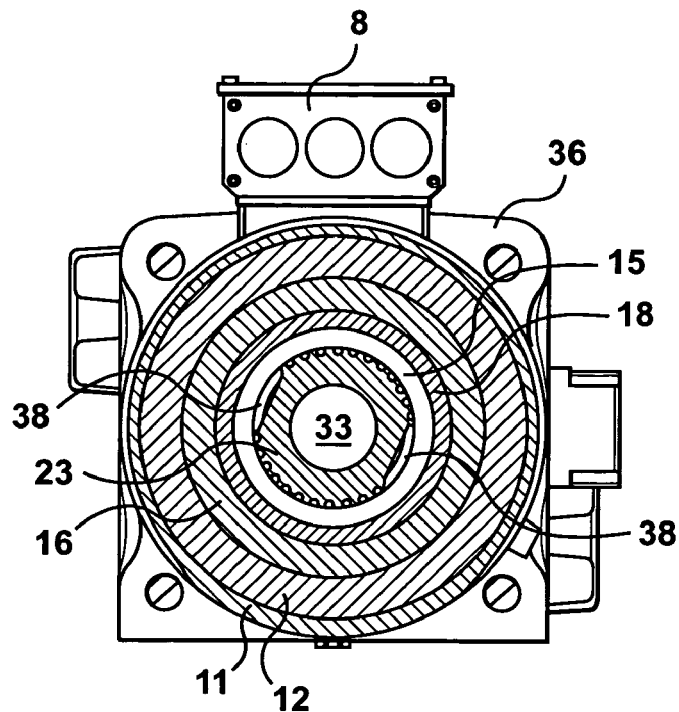
FIG. 2C is a cross-sectional view of a portion of the piston and spline insert.
Figure 2D:
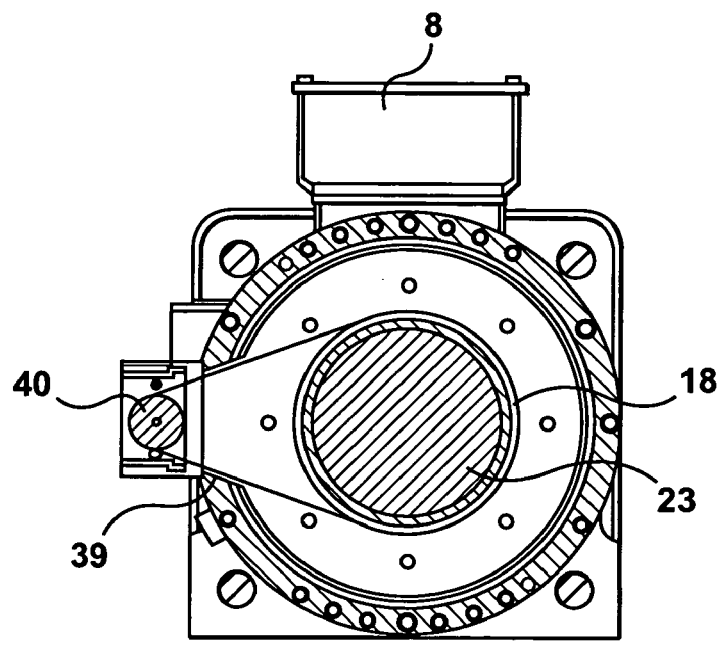
FIG. 2D is a cross sectional view of the timing belt and encoder.

The piston 23 and attached screw 1 are retracted by means of the build-up of material at the head of the screw 1 in a manner well known in the art. To prevent voids in the melt, a low pressure is applied through the region 32 to the bore side of the piston 23. Slots 38 (See FIG. 2C) are provided in spline insert 15 to ensure fluid communication between regions 34 and 35.

The cylinder wall 18 is supported in roller bearing races 13 and 14 to facilitate rotation of the assembly with minimal friction losses. Roller bearing race 13 is supported in end piece 41 and ball bearing race 14 is supported by ring 89.

Dowels 27 extend from motor housing 11 into end piece 41 and cylinder ring 36. The dowels 27 prevent any tendency for the end piece 41 and cylinder ring 36 to rotate relative to the motor stator 12 as a consequence of rotational pressures created by the rotation of the rotor 16 and piston 23.

Dowels 28 extend from rear housing 26 into cylinder wall 22 to prevent any tendency of the cylinder wall 22 to rotate in response to rotation of piston head 24.

Cylinder wall 22 is in sealing engagement with cylinder ring 36 and rear housing 26. As these seals are only subject to radial stress, they are less likely to leak or rupture than seals that are subjected to both radial and axial stresses.

Tie rods 19 extend from the rear housing 26 to the barrel retaining plate 5 and housing 3 to clamp the entire drive assembly together.

Temposonic rod 20 is attached to rear housing 26 and extends through an opening in piston head 24. A magnet assembly 21 on piston head 24 responds to movement of piston head 24 to send a signal through rod 20 that indicates the position of piston head 24 and consequently screw 1 in a manner well understood by those skilled in injection-molding.

The rotational speed and position of screw 1 is determined by means of a timing belt 39 and encoder 40 in a manner well understood in the art of servomotor control.

In operation, the region 32 is pressurized through port 25. This forces piston 23 and the attached injection screw 1 to move forward. Plastic in front of the screw 1 is injected into a mold cavity. At the end of the injection, region 32 is retained at a lower pressure for a short duration. The region 32 is then depressurized and region 35 pressurized so that piston 23 retracts a short distance. The hollow motor 30 turns on to rotate the piston 23 and the attached screw 1 to melt plastic pellets supplied to the screw 1 through opening 4. During this interval, it may be necessary to keep a relatively low pressure in region 32 to prevent voids and bubbles from forming in the melt. The motor 30 is stopped when the screw 1 retracts to a predetermined position. Further retraction of the screw 1 may occur to relieve the melt pressure. After the screw 1 has fully retracted, the next injection cycle is initiated and the injection process is repeated to provide melt to the mold cavity.

Figure 5:
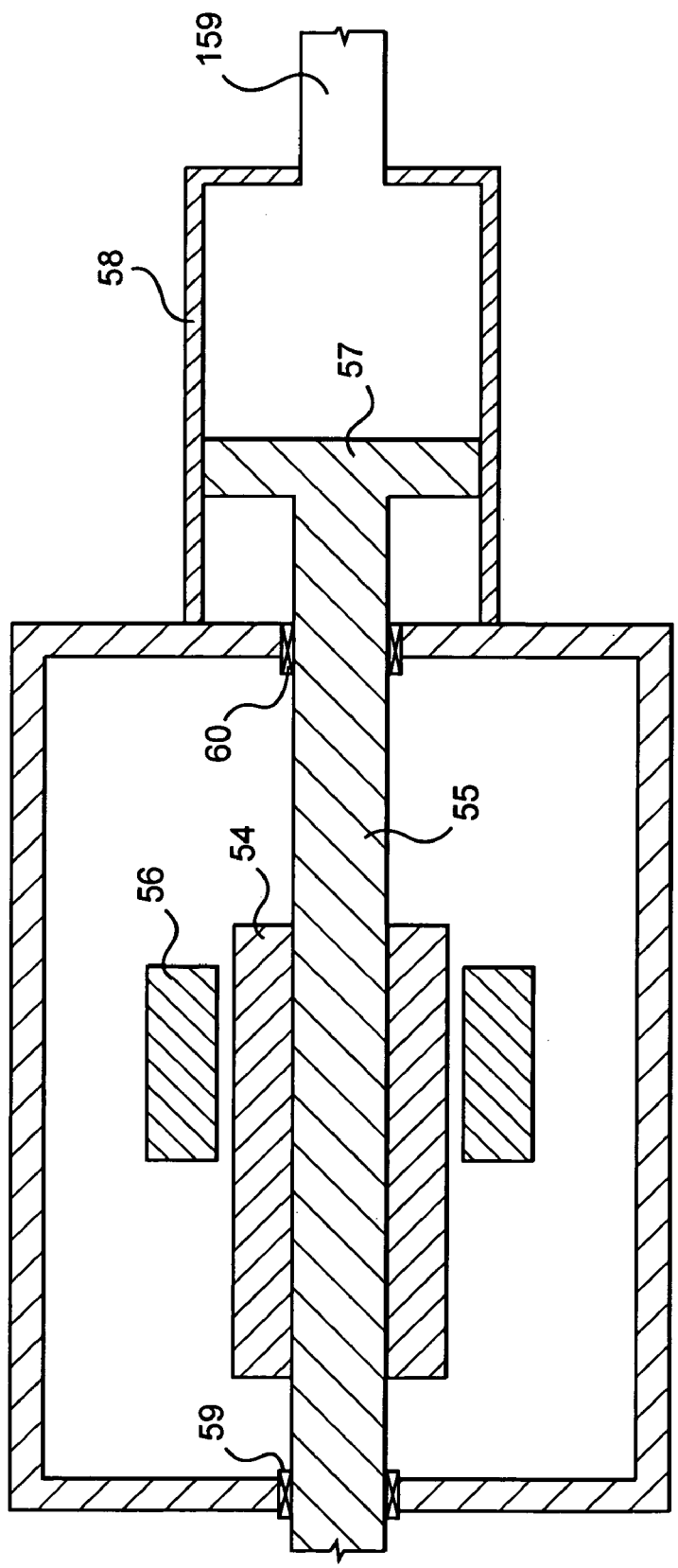
FIG. 5 is a cross-sectional sketch of another embodiment of the invention.

FIG. 5 illustrates schematically a further embodiment of the invention. In this embodiment the rotor 54 is firmly attached to a piston 55 and has a width at least as wide as the combined length of the stroke of the piston 55 and the width of the stator 56. Piston head 57 reciprocates in cylinder 58.

Cylinder 58 is shown with a single fluid inlet 159. A second inlet could be provided, however, in some applications a second inlet may not be required. For example, in the case of a plasticating screw for an injection-molding machine the build-up of plastic injection material at the end of the screw may provide sufficient pressure on the screw to move the piston back to its injection position.

This embodiment has the advantages of keeping the entire motor out of the hydraulic portion of the drive and removes the need for a spline shaft connection since the piston 55 is free to rotate and translate on the bearings 59 and 60.

The embodiment shown in FIG. 5 could be further modified to make the stator 56 longer and the rotor 54 shorter. The drive unit would operate in the same manner but the reduced size of the rotor 54 would reduce the weight on the piston 55 and reduce the cost of the motor.

Figure 6A:
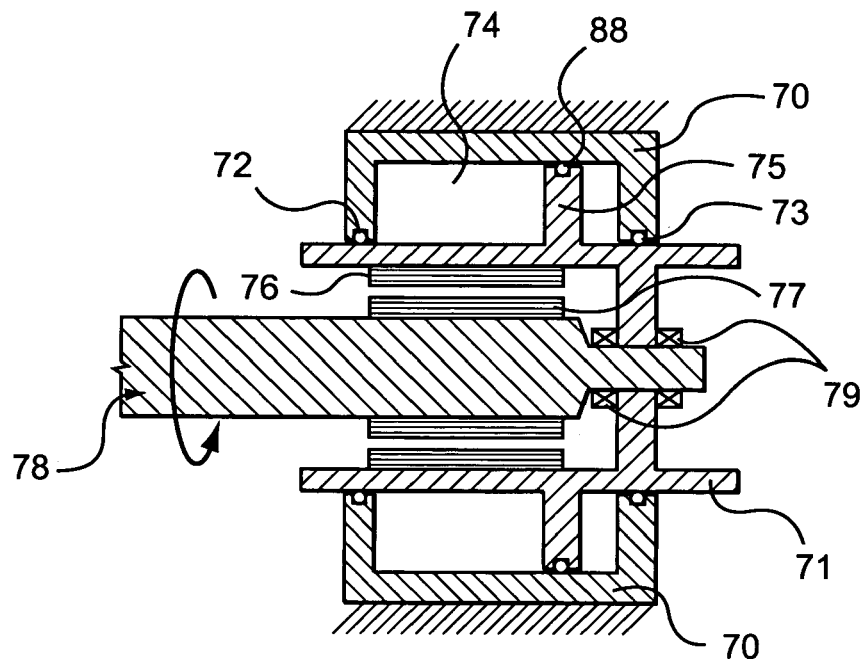
FIGS. 6A and 6B are cross-sectional views of another embodiment of the invention having the driving cylinder surrounding the hollow motor.
Figure 6B:
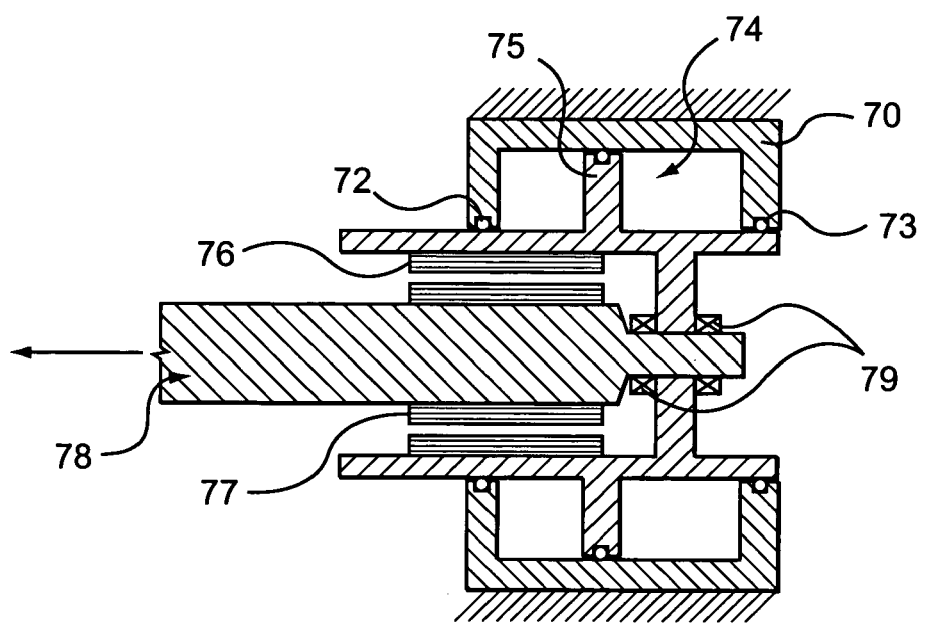

In the embodiment of the invention shown in FIGS. 6A and 6B, the drive cylinder surrounds the hollow motor. Stationary cylinder housing 70 supports a non-rotating piston 71 on bearings 72 and 73. The bearings 72 and 73 permit piston 71 to move lengthwise. Housing 70 and piston 71 form a piston chamber 74. A toroidal piston face 75 extends from piston 71 to provide a driving surface for lengthwise movement of the assembly. Piston face 75 is surrounded by piston rings 88.

The stator 76 of a hollow motor is attached to an inner surface of piston 71 in operating relationship with rotor 77 of the motor. Rotor 77 is attached to the shaft 78.

With this arrangement, rotor 77 of the hollow electric motor is rotated to thereby rotate the shaft 78. The shaft 78 is supported by and rotates in bearings 79.

Providing fluid pressure on either side of piston face 75 moves the entire assembly of the piston 71, stator 76, rotor 77 and shaft 78 lengthwise.

FIG. 6A shows the shaft 78 in a retracted position. FIG. 6B shows the shaft 78 in its extended position.

The arrangement shown in FIGS. 6A and 6B has the advantage of being of short length but does require a larger part of the assembly to move lengthwise. This embodiment also removes the requirement for a spline shaft or equivalent means.

FIGS. 7 and 7A show a modification to the embodiment shown in FIGS. 6A and 6B where, instead of having a single toroidal piston, two separate pistons are provided. In this embodiment the pistons are fixed and the cylinder translates.

As shown in FIG. 7, shaft 80 is supported by and rotates on bearings 81 and 82. Stator winding 83 is fixed to housing 84. Housing 84 also encloses pistons 85 and 86 in cylinders 187 and 188, respectively. Fluid connections (not shown) are provided to the cylinders 187 and 188 to drive the pistons 85 and 86 in a manner well understood in the art. The rotor 87 of the hollow electric motor is fixed to the shaft 80.

In operation, energization of the stator 83 causes the rotor 87 to rotate and thereby rotate the shaft 80. Providing fluid pressure to the pistons 85 and 86 forces the housing 84 to move lengthwise. The lengthwise motion of the housing 84 forces the stator 83, rotor 87 and shaft 80 to also move in a lengthwise direction.

The embodiment shown in FIG. 7 is compact and does not require a single large toroidal cylinder or a spindle drive. However, it does require the entire housing assembly including the hollow motor and the cylinders to move lengthwise.

The selection of an appropriate embodiment of the invention would be determined by the requirements of the application being addressed. For example, if limited length was available, the embodiment shown in FIGS. 6A and 6B or FIG. 7 might be selected whereas if weight on the shaft were a concern other embodiments may be better suited.

It is to be understood by persons skilled in the art that the invention is not limited to the illustrations described herein, which are deemed to illustrate the best modes of carrying out the invention, and which are susceptible to modification of form, size, arrangement of parts and details of operation.

The invention is intended to encompass all such modifications, which are within its spirit and scope as defined by the claims.

What is claimed is:

1. An injection unit for an injection molding machine, the injection unit comprising:
    a hollow electric motor,
    a first cylinder wall of a first hydraulic cylinder joined to a rotor of said hollow electric motor,
    a second cylinder wall of a second hydraulic cylinder connected to a stationary portion of said hollow electric motor,
    a piston slidable along interior surfaces of said first cylinder wall and said second cylinder wall, a first end portion of said piston engaging said first cylinder wall and a second end portion of said piston engaging said second cylinder wall,
    rotating structure attached to said rotor and configured to rotate said piston, said rotating structure being configured such that said piston slides along said first cylinder wall and said second cylinder wall,
    structure configured to provide hydraulic fluid to drive said piston along said first cylinder wall and said second cylinder wall, and
    structure configured to attach an injection screw to said piston, whereby said piston slides lengthwise along said first cylinder wall and said second cylinder wall when hydraulically driven and is rotated by said rotating structure when said hollow electric motor is activated to rotate said rotor.

2. The injection unit as defined in claim 1, wherein said rotating structure includes a spline insert engaging splines on said piston.

3. The injection unit as defined in any one of claim 1 and claim 2, wherein said rotating structure includes said first cylinder wall.

4. The injection unit as defined in any one of claim 1 and claim 2, wherein said second cylinder wall is of larger diameter than said first cylinder wall.

5. The injection unit as defined in any one of claim 1 and claim 2, further comprising:
    structure configured to sense rotational position and speed of rotation of said piston.

6. The injection unit as defined in any one of claim 1 and claim 2, further comprising:
    structure configured to sense rotational position and speed of rotation of said piston, and wherein said structure configured to sense includes a timing belt and an encoding device.

7. The injection unit as defined in any one of claim 1 and claim 2, further comprising:
    a temposonic rod attached to said first end portion or said second end portion of said piston to sense a longitudinal position of said piston within a corresponding cylinder.

8. The injection unit as defined in any one of claim 1 and claim 2, further comprising:
    dowel structure disposed between said second cylinder wall and a rear housing of said second hydraulic cylinder, said dowel structure configured to prevent rotational movement of said second cylinder wall relative to said rear housing.

9. The injection unit as defined in any one of claim 1 and claim 2, further comprising:
    dowel structure disposed between (i) a housing member of said hollow electric motor and (ii) a cylinder ring supporting said housing member, said dowel structure being configured to prevent relative rotation of a motor stator with respect to said cylinder ring.

10. The injection unit as defined in any one of claim 1 and claim 2, wherein said rotor is fitted to said first cylinder wall.

11. The injection unit as defined in any one of claim 1 and claim 2, wherein said first cylinder wall rotates on ball bearing races.

12. A drive unit for translating and rotating a shaft, said drive unit comprising:
    a hollow electric motor and at least one fluid cylinder, said fluid cylinder having a piston coupled to the shaft,
    first connecting structure configured to connect at least a portion of said shaft to a rotor of said hollow electric motor,
    movement structure being configured such that said shaft moves lengthwise, and
    second connecting structure configured to connect said at least one fluid cylinder to said shaft whereby said piston may be (i) rotated by said hollow electric motor and (ii) moved lengthwise by said at least one fluid cylinder.

13. The drive unit as defined in claim 12, wherein said fluid cylinder encircles said hollow electric motor.

14. The drive unit as defined in claim 12, wherein said rotor encircles said at least one fluid cylinder.

15. The drive unit as defined in claim 12, wherein said movement structure includes (i) spline insert on a wall of said at least one fluid cylinder and (ii) splines on said shaft.

16. The drive unit as defined in claim 15, wherein said at least one fluid cylinder includes a piston attached to an end of said shaft.

17. The drive unit as defined in any one of claims 12, 14, 15 and 16, wherein said rotor of said hollow electric motor is attached to an outer wall of said at least one fluid cylinder.

18. The drive unit as defined in claim 15, wherein said spline insert is on an interior wall of said at least one fluid cylinder.

19. The drive unit as defined in claim 12, wherein said hollow electric motor includes a stator, and wherein said rotor has a width substantially greater than a width of said stator.

20. The drive unit as defined in claim 19, wherein said rotor has a width substantially equal to a combined width of (i) said stator and (ii) a stroke of a piston in said at least one fluid cylinder.

21. The drive unit as defined of claim 19, wherein said rotor (i) is attached to a piston and (ii) is configured to move lengthwise with said piston.

22. The drive unit as defined in claim 12, wherein said hollow electric motor includes a stator, and wherein said stator has a width substantially greater than a width of said rotor.

23. The drive unit as defined in claim 22, wherein said stator has a width substantially equal to a combined width of (i) said rotor and (ii) a stroke of a piston in said at least one fluid cylinder.

24. The drive unit as defined of claim 23, wherein said rotor (i) is attached to said piston and (ii) is configured to move lengthwise with said piston.

25. The drive unit as defined in claim 12, 14, 15 and 18, wherein said at least one fluid cylinder is configured to rotate on bearings on a fixed motor housing.

26. The drive unit as defined in claim 12, wherein said at least one fluid cylinder includes a piston, wherein and said at least one fluid cylinder, said piston, and said rotor all rotate as a single unit, and wherein said piston is configured to move lengthwise within said at least one fluid cylinder.

27. The drive unit as defined in claim 12, wherein said drive unit includes a motor housing, and wherein said at least one fluid cylinder is attached to an outer wall of a housing.

28. The drive unit as defined in claim 27, wherein said hollow electric motor includes a stator, and wherein said rotor has a width substantially greater than a width of said stator.

29. The drive unit as defined in claim 28, wherein said rotor has a width substantially equal to a combined width of (i) said stator and (ii) a stroke of a piston in said at least one fluid cylinder.

30. The drive unit as defined in claim 29, wherein said rotor is attached to said piston and is configured to move lengthwise with said piston.

31. The drive unit as defined in claim 25, wherein said hollow electric motor includes a stator, and wherein said stator has a width substantially greater than a width of said rotor.

32. The drive unit as defined in claim 31, wherein said stator has a width substantially equal to a combined width of (i) said rotor and (ii) a stroke of a piston in said at least one fluid cylinder.

33. The drive unit as defined in claim 12, wherein said at least one fluid cylinder comprises a plurality of cylinders.

34. The drive unit as defined in claim 12, wherein said at least one fluid cylinder comprises two cylinders.

35. The drive unit as defined in any one of claim 33 and claim 34, wherein said shaft is configured to rotate on bearings on a motor housing.

36. The drive unit as defined in any one of claim 33 and claim 34, wherein said drive unit includes a housing, and wherein said at least one fluid cylinder is located along a peripheral wall of said housing.

37. The drive unit as defined in any one of claims 33 and 34, wherein said rotor is attached to said shaft and is configured to move lengthwise with said shaft.

38. The injection unit as defined in claim 1, wherein said first hydraulic cylinder is disposed at least partially within said hollow electric motor.

39. The drive unit as defined in claim 12, wherein said at least one fluid cylinder is disposed at least partially within said hollow electric motor.

* * * * *